United States Patent [19]

Heisner et al.

[11] Patent Number: 4,653,665

[45] Date of Patent: Mar. 31, 1987

[54] CONNECTOR CASSETTE AND FEED SYSTEM

[75] Inventors: Douglas L. Heisner; Wayne A. Zahlit, both of Downers Grove, Ill.

[73] Assignee: Molex Incorporated, Lisle, Ill.

[21] Appl. No.: 584,047

[22] Filed: Feb. 27, 1984

[51] Int. Cl.[4] .............................................. B65G 59/00

[52] U.S. Cl. ....................................... 221/11; 221/14; 221/17; 221/104; 221/106; 221/198; 221/224; 221/278; 221/289

[58] Field of Search .................. 221/11, 14, 106, 103, 221/104, 92, 287, 197, 198, 278, 2, 6, 17, 224, 225, 251, 289; 29/740, 809; 414/126

[56] References Cited

U.S. PATENT DOCUMENTS

| | | | |
|---|---|---|---|
| 2,325,165 | 7/1943 | Goodwin | 221/104 X |
| 3,591,041 | 7/1971 | DiGrande | 221/11 |
| 4,401,234 | 8/1983 | Droira et al. | 221/106 |
| 4,465,206 | 8/1984 | Sorel et al. | 221/278 X |
| 4,488,662 | 12/1984 | Fanning | 221/197 |
| 4,500,246 | 2/1985 | Janisiewicz et al. | 221/11 |

*Primary Examiner*—H. Grant Skaggs

*Assistant Examiner*—David H. Bollinger

*Attorney, Agent, or Firm*—Louis A. Hecht; John W. Cornell

[57] ABSTRACT

Electrical connectors are slidably received in side-by-side serial array in elongated, hollow tubular cassettes. The cassettes are shaped to receive the connectors only in a single orientation, and protect terminals which partly extend from the connector housings in an intermediate assembly stage. Cassettes are vertically stacked in a feed system, and when the bottom cassette is emptied of connectors, it is released from the stack and replaced with a full cassette.

6 Claims, 6 Drawing Figures

CONNECTOR CASSETTE AND FEED SYSTEM

BACKGROUND OF THE INVENTION

1. Field of the Invention

This invention relates to cassettes for containing electrical connector components and to apparatus for feeding the components from cassettes.

2. Brief Description of the Prior Art

There is an ever-increasing need for automated feeding and terminating equipment for electrical connectors in order to reduce labor costs and increase speed and reliability. Automatic equipment used for these purposes is complex and expensive due to the difficulties encountered in handling individual electrical connector components. Since contact spacings and the size of electrical connectors are decreasing with the trend toward miniaturization, the problems of shipping, storage and automatic handling of connector components are increased.

One type of electrical connector is assembled in stages. In an intermediate condition, terminals associated with the connector are partly inserted into the connector housing. Portions of the terminals extend from the housing and are terminated to conductors before the terminals are fully inserted into a final position within the housing. The connectors may be produced, shipped and stored in the intermediate assembly stage, and then must be oriented and fed to automatic or partly automatic terminating machinery. With this type of connector, problems are encountered not only due to the difficulty of orienting and feeding the connectors, but also due to the vulnerability of the exposed portions of the delicate terminals which extend from the housing in the intermediate assembly condition. Premature insertion of terminals from the intermediate to the final position must be prevented.

SUMMARY OF THE INVENTION

Among the important objects of the present invention are to provide a cassette in which electrical connector components are received in a side-by-side serial array in one specific orientation; to provide a cassette capable of protecting electrical connector components during shipment and storage; and to provide a cassette for maintaining electrical connector components in a desired, uniform orientation from the time of manufacture to the time of final termination.

Other important objects of the present invention are to provide apparatus for feeding electrical connector components from cassettes; to provide apparatus for automatically dispensing electrical connector components in a serial array from a number of cassettes in sequence; and to provide an electrical connector feed system overcoming disadvantages of feed systems used in the part.

In one form of the invention currently contemplated, electrical connector components are fed to automated terminating equipment or the like from an elongated, generally tubular, hollow cassette having a uniform cross sectional shape throughout its length. Numerous similar electrical connector housings, all with the same profile, are supplied in the cassette. The cross sectional shape of the cassette corresponds to the connector housing profile in one specific housing orientation. The numerous connector housings are slidably received in and contained in a serial array within the cassette.

In accordance with the invention currently contemplated, connector feeding apparatus is provided for supplying electrical connector components from the cassettes. The feeding apparatus includes support means for holding a plurality of cassettes in generally parallel, side-by-side relation. A component feed path is aligned with and extends away from a first one of the plurality of cassettes. The serial array of components in the first cassette is pushed from the cassette into the component feed path. A sensor provides a control signal when the final component of the serial array is pushed from the first cassette, and cassette advancing means responsive to the control signal replaces the first cassette with an adjacent second cassette when the first cassette is emptied.

DESCRIPTION OF THE PREFERRED EMBODIMENT

Figure 1:
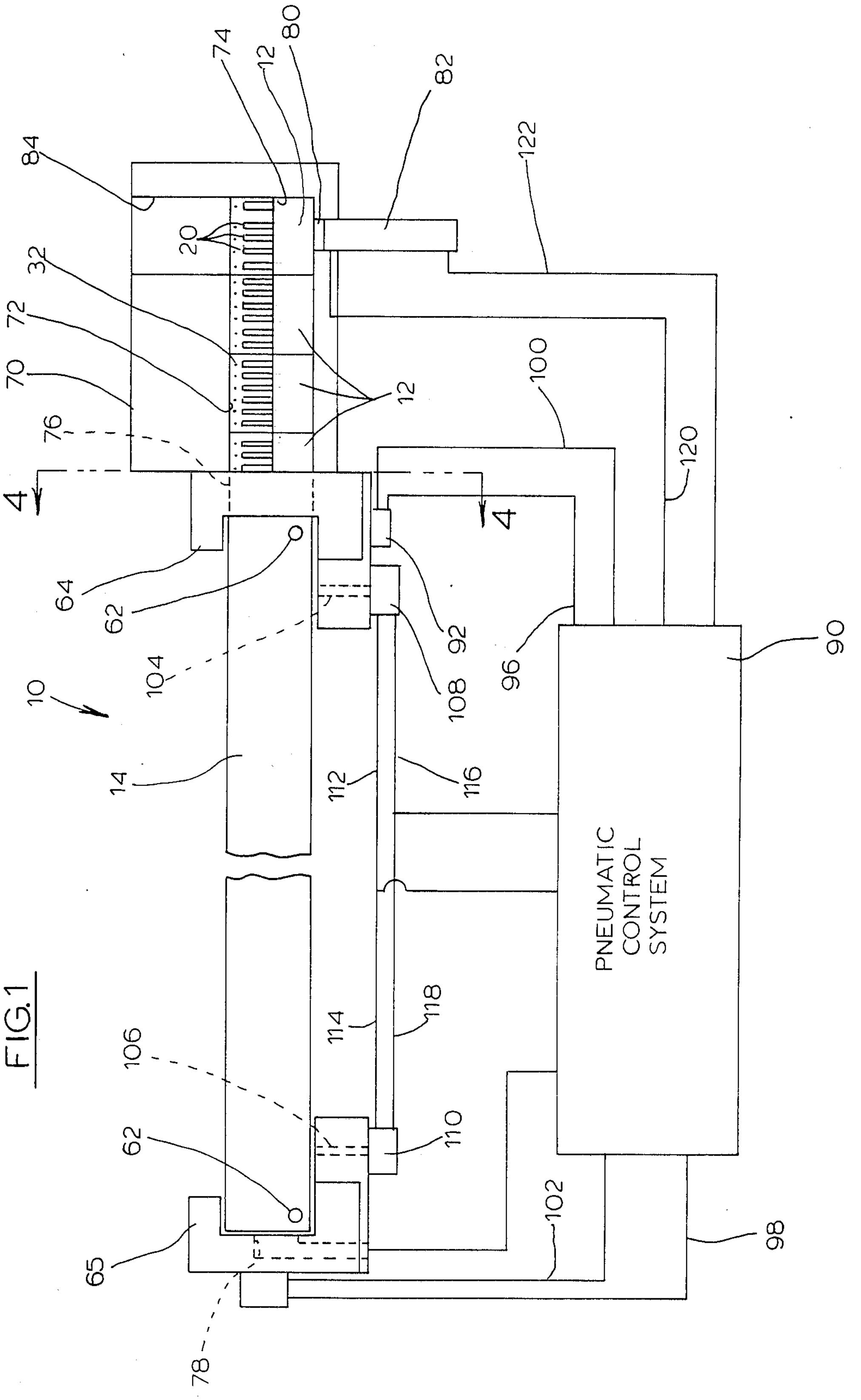
FIG. 1 is a somewhat schematic and diagrammatic top view of connector feed apparatus of the present invention.
Figure 2:
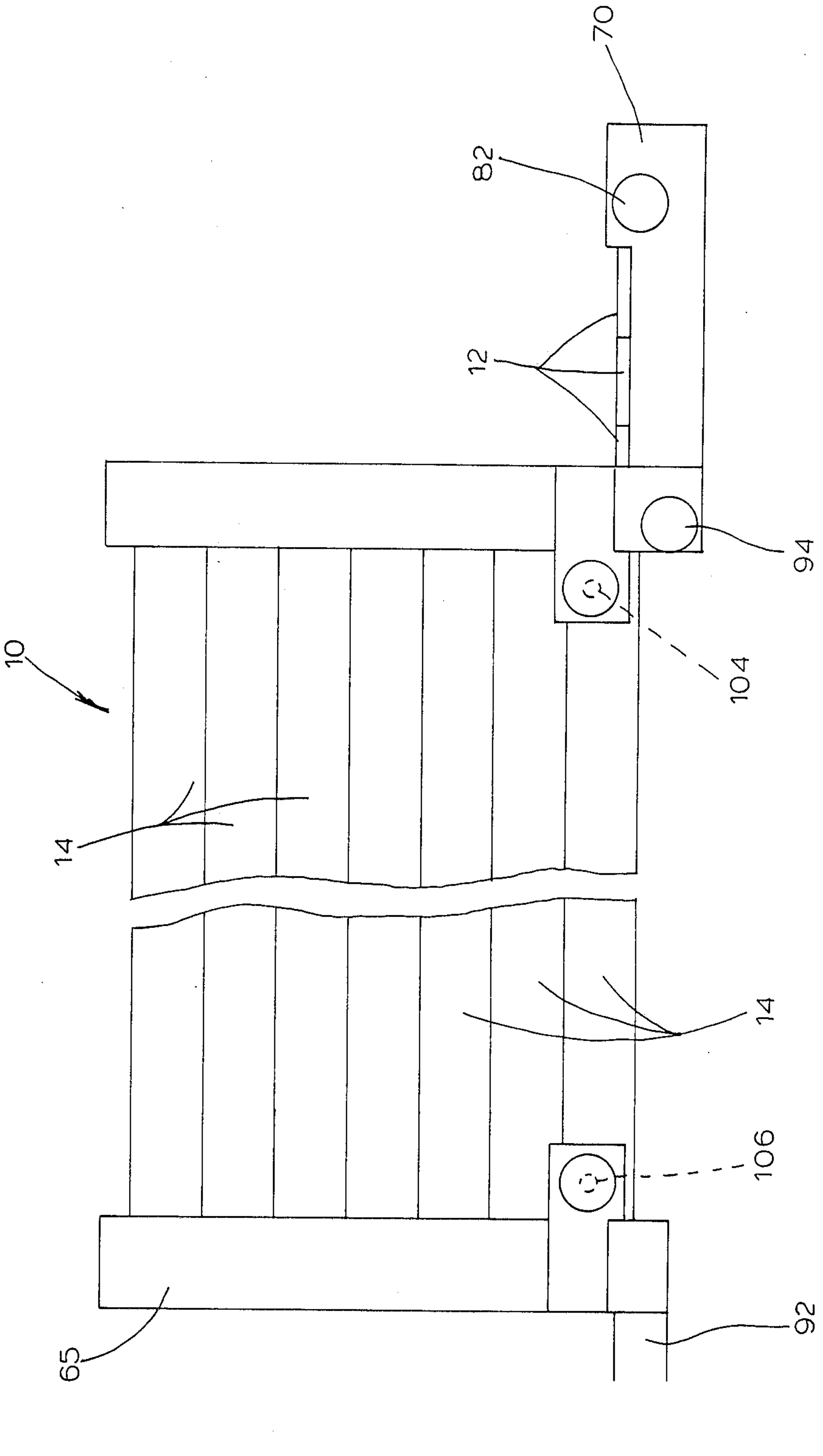
FIG. 2 is a side elevational view of the apparatus of FIG. 1.
Figure 3:
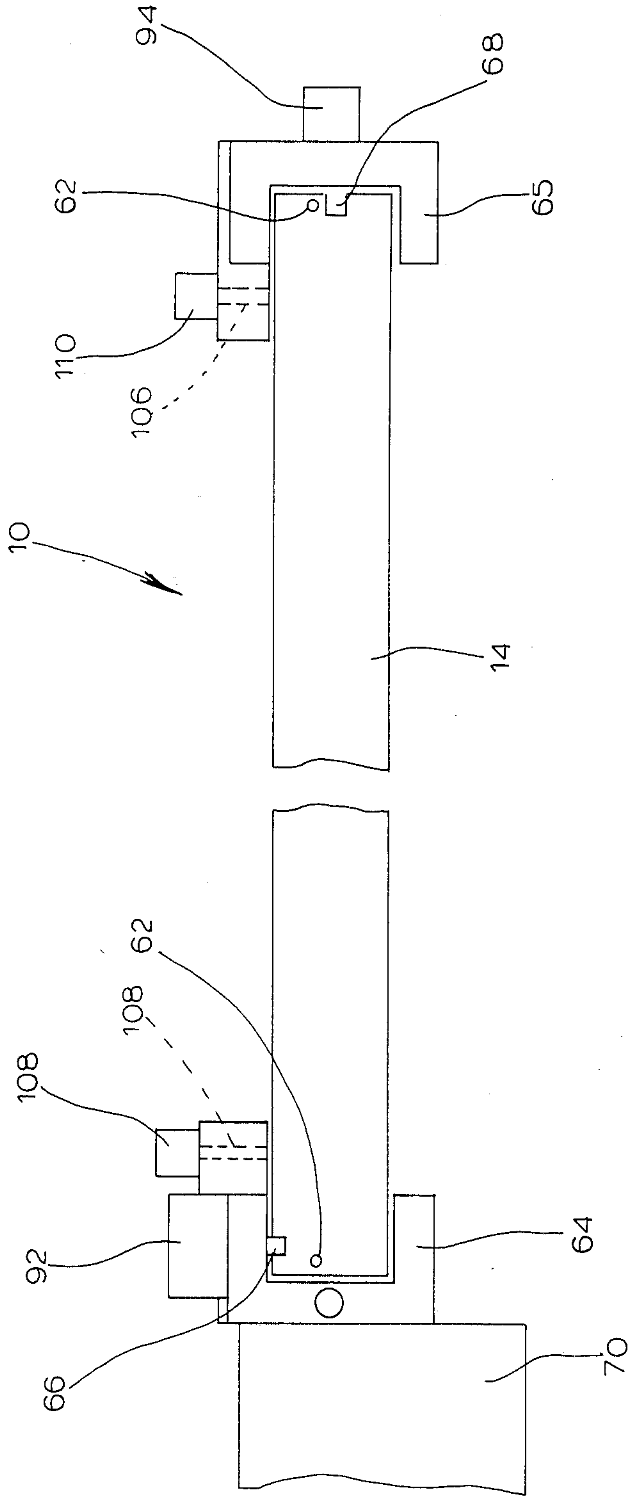
FIG. 3 is a bottom view of the apparatus of FIG. 1.

In the drawings, FIGS. 1–3 illustrate a feed apparatus generally designated as 10 constructed in accordance with the present invention. Apparatus 10 feeds electrical connectors 12 to a point of use such as automated connector terminating equipment or the like (not shown). In accordance with the invention, the connectors 12 are contained in cassettes, each generally designated as 14.

Figure 5:
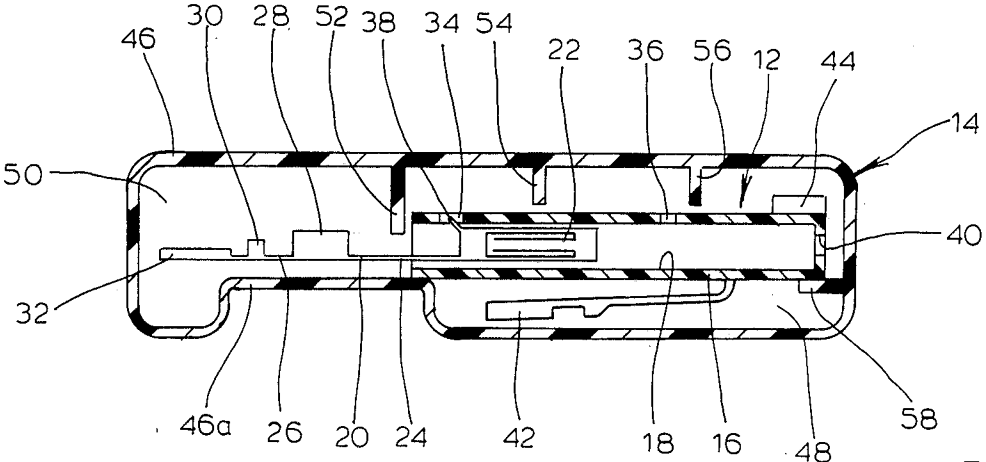
FIG. 5 is a sectional view on an enlarged scale taken in the transverse direction through a loaded cassette of the present invention.

The principles of the present invention can be employed with the handling and feeding of electrical connectors of many different types. In the preferred embodiment illustrated in the drawings, and as best seen in FIGS. 1 and 5, the connectors 12 are of the type adapted to be partly assembled at the point of manufacture and thereafter to be terminated and finally assembled at a different location. Each connector 12 includes a housing 16 including several terminal receiving cavities 18 (FIG. 5) in which conductive metal terminals 20 may be inserted. In the intermediate stage of connector assembly illustrated in the drawings, terminals 20 are partly inserted into housing cavities 18 and portions of the terminals extend outwardly of the housing 16.

Each terminal 20 includes a box or barrel shaped contact portion 22 located at one end of the terminal. A planar base section 24 joins the box contact portion 22 with a conductor contact portion 26 at the other end of the terminal. Contact portion 26 includes an insulation displacement section 28 and a crimp section 30 providing a strain relief function when the terminal 20 is connected to a conductor. A carrier strip 32 extends transversely to join the terminals 20 of each connector housing 16 for ease of handling, and is severed or broken off from the terminals 20 in conjunction with the terminating operation.

Housing 16 includes two spaced apart stop structures in the form of apertures or recesses 34 and 36 formed along each cavity 18 in a wall of the housing. A stop tang 38 of each terminal 20 is engagable with aperture 34 in the illustrated intermediate assembly condition. After a conductor has been terminated to the terminal 20, the terminal is movable into the recess to a fully inserted position in which the stop tang 38 engages the aperture 36. An additional aperture 40 formed in housing 16 communicates with each cavity 18 so that a pin contact or other conductor can be inserted through the aperture 40 to make an electrical connection with the box contact portion 22 of the terminal 20 in its final assembly position. In the particular connector housing configuration illustrated in the drawings, each housing includes a flexible and resilient locking tang 42 useful in mounting the finished connector in association with a mating connector, as well as one or more projecting tabs 44 which may form an indexing or guiding function.

In accordance with one important feature of the present invention, a number of the electrical connectors 12 are contained in a cassette 14. The cassette 14 is an elongated, hollow, tubular body of material having an essentially uniform cross section throughout its length. This cross section is best illustrated in FIG. 5 wherein it can be seen that the cassette includes a continuous outer wall 46 generally conforming to a substantially rectangular outline. One advantage of this shape is that, as described below in connection with the feed apparatus 10, a number of the cassettes 14 can be arranged side-by-side in stacks or rows.

Cassette wall 46 defines a first region 48 for slidably receiving housing 16 of connectors 12. An adjacent second region 50 encloses the projecting portions of the terminals 20 when the connectors are in the illustrated, partly assembled position. An indented portion 46A of the wall 46 and a number of continuous, inwardly extending ribs 52, 54, 56 and 58 define a nest-like structure for capturing the housings 16 of connectors 12 in the region 48. The configuration of these elements of the cassette 14 permits the connectors 12 to be inserted into the cassette 14 only in the specific configuration illustrated in FIG. 5. If a connector 12 is inverted either vertically or horizontally to a different position, then the connector cannot be inserted into the cassette 14.

Figure 6:
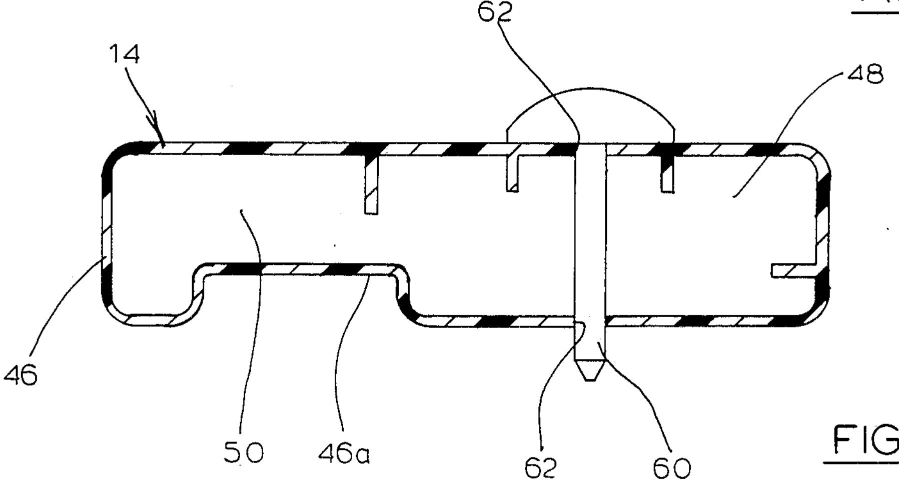
FIG. 6 is a sectional view on a reduced scale illustrating one end of the cassette prior to its insertion into the feed system of FIG. 1.

In use, numerous ones of the connectors 12 are partly assembled to the intermediate condition illustrated in the drawings, typically by automated equipment which supplies the connectors one at a time in series in a consistent and predetermined orientation. At this point in the manufacturing process, a number of the connectors are loaded into one end of a cassette 14 until the cassette is substantially full of connectors in a serial, side-by-side array with the terminal cavities 18 extending transversely to the length of the cassette. In order to prevent connectors 12 from being accidentally removed from the cassette 14, both ends of the cassette are provided with a pin 60 (FIG. 6) frictionally and releasably retained in holes 62 formed in the cassette. In order to remove connectors 12 from the cassette 14, one or both of the pins 60 is withdrawn from the holes 62.

Cassette 14 protects the connectors 12 while they are in their intermediate assembly condition. The delicate projecting portions of the terminals 20 cannot be deformed or damaged. In addition, the terminals 20 cannot be accidentally moved from the intermediate to the final assembly position prior to termination. When the connectors 12 have been loaded into the cassettes 14, they can be handled, shipped and stored in their oriented serial array without the necessity for reorienting the connectors at the time of termination and final assembly.

Turning now to FIGS. 1–4, the feed apparatus 10 dispenses electrical connectors 12 from cassettes 14 and automatically delivers the connectors to a point of use such as automated terminating equipment or the like. Apparatus 10 supports a number of loaded cassettes 14, feeds connectors 12 from one cassette, and automatically replaces the cassette when emptied with the next adjacent loaded cassette.

In the illustrated embodiment of the invention, apparatus 10 includes a pair of generally C-shaped support columns 64 and 65 bracketing or partly enclosing the ends of a vertical stack of cassettes 14 (FIGS. 1 and 3). Principles of the invention are applicable to other arrangements; for example cassettes 14 may be arrayed in a horizontal row, or a number of vertical stacks may be arranged side-by-side. In the illustrated apparatus 10, the stack of cassettes 14 is vertically suspended upon a pair of base members 66 and 68 engaging the underside of the lowermost cassette 14. Prior to stacking cassettes 14 in the feed apparatus 10, the stop pins 60 are removed from the cassettes to permit sliding movement of the connectors 12 out of the cassettes 14.

Figure 4:
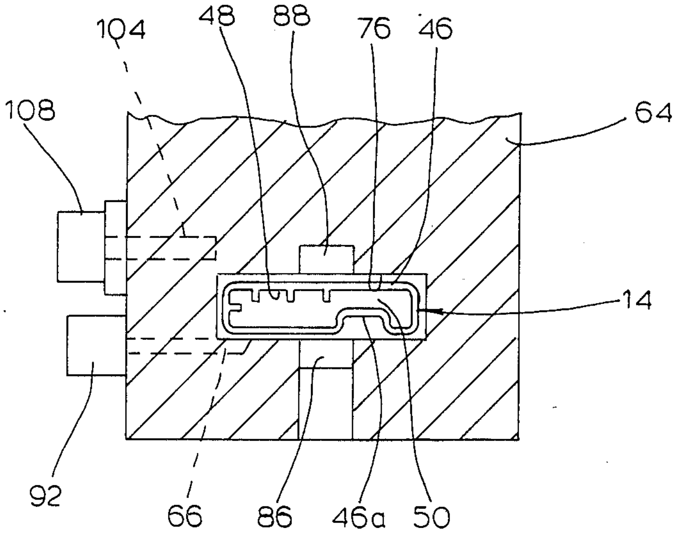
FIG. 4 is a fragmentary sectional view of the apparatus of FIG. 1 on an enlarged scale taken along the line 4—4 of FIG. 1.

A support member 70 located adjacent one of the columns 64 defines a feed path 72 aligned with and extending away from one end of the lowermost cassette 14 and terminating in a stop surface or abutment 74. As seen in FIG. 4, a passage 76 extends through support column 64 to permit connectors 12 to move from cassette 14 into the feed path 72.

The other support column 65 includes a passageway 78 (FIG. 1) through which pressurized air is admitted to the opposite end of the lowermost cassette 14 to push the serial array of cassettes 14 out of the cassette, through the passage 76 and along the feed path 72 against the stop surface 74. Connectors may be dispensed from the feed path 72 and advanced to a point of use such as automated terminating equipment. In the illustrated arrangement, a pusher 80 operated by an air cylinder 82 moves connectors at right angles along a delivery path 84 away from the feed path 72. As connectors 12 are delivered from the feed path 72, the serial array of connectors from the cassette 14 continues to be fed one at a time against the stop surface 74 by means of air pressure supplied through passage 78.

When the lowermost cassette 14 is emptied of connectors 12, the apparatus 10 automatically replaces the empty cassette with the next adjacent loaded cassette. A sensor is provided for indicating when the lowermost cassette 14 is emptied. As illustrated in FIG. 4, the sensor may take the form of an optical device including a light source 86 and a light sensitive device 88 disposed on opposite sides of passage 76 in the support column 64. When the last connector 12 of the cassette 14 moves through the passage 76, a control signal is provided to indicate that the lowermost cassette 14 is empty.

In the illustrated embodiment of the invention, a pneumatic control system 90 is provided for controlling the replacement of empty cassettes in response to a control signal indicating that the cassette in use is empty. The base members 66 and 68 are movable under the control of air cylinders 92 and 94 respectively. Normally, the control system 90 pressurizes pressure lines 96 and 98 to maintain the base members 66 and 68 in the extended position illustrated in FIG. 3. When the lowermost cassette is empty, lines 96 and 98 are depressurized and lines 100 and 102 are pressurized so that the cylinders 92 and 94 withdraw the base members 66 and 68 to permit the emptied cassette to drop from the stack and out of the support columns 64 and 65.

A pair of gripping elements 104 and 106 retain the second cassette 14 and the upper portion of the stack of cassettes while the base members 66 and 68 are retracted. Gripping elements 104 and 106 are controlled by air cylinders 108 and 110. Normally, the gripping elements are in their illustrated retracted positions due to pressurization of lines 112 and 114. Prior to retraction of the base members 66 and 68, the control system 90 depressurizes the lines 112 and 114 and pressurizes lines 116 and 118 to extend the gripping elements 104 and 106 tightly against the next adjacent cassette 14.

After the empty lowermost cassette drops from the stack of cassettes, the base members 66 and 68 are returned to their normal position by pressurization of lines 96 and 98. Thereafter, the gripping elements 104 and 106 are retracted by pressurization of lines 112 and 114 so that the stack of cassettes drops with the next loaded cassette 14 in engagement with the base members 66 and 68. At this point, the next cassette is in alignment with the passage 76 and feed path 72 so that the advancing of connectors 12 along the feed path 76 and against the stop surface 74 is continued automatically without interrupting the supply of cassettes delivered through the delivery path 84. If desired, the control system 90 may operate to disable the air cylinder 82 and pusher 80 by pressurizing line 120 and depressurizing line 122 during the time that an empty cassette 14 is being replaced with a loaded cassette.

The supply of pressurized air to the passage 78 in the support column 65 may be continuous. If desired, the pneumatic control system 90 can interrupt the supply of pressurized air during the time that an empty cassette is removed from the bottom of the stack of cassettes.

The cassette and feed apparatus of the present invention is especially suited for use with small electrical connectors which are difficult to handle in bulk and to orient for feeding and termination. In one preferred form of the invention, the connectors 12 include terminals arranged at a contact spacing of about 0.010 inch. The cassette 14 is approximately 25 inches long and contains 30 connectors 12, each having eight terminal positions. The cassette 14 can conveniently be fabricated as an inexpensive plastic extrusion, and may be formed of transparent or translucent material so that a loaded cassette can readily be distinguished from an empty cassette.

What is claimed and desired to be secured by Letters Patent is:

1. Connector feeding apparatus for supplying electrical connector components to automated terminating apparatus or the like from elongated hollow cassettes in each of which numerous components are loaded in a serial array, said apparatus comprising:

support means for holding a plurality of horizontally disposed cassettes in generally parallel, side-by-side relation, including vertically extending guide members for confining said plurality of cassettes in a vertical stack, and base means for supporting a first one of the plurality of cassettes at the bottom of said vertical stack;

means defining a component feed path aligned with and extending away from said first cassette;

means for pushing the serial array of components of said first cassette from said first cassette and into said feed path;

a sensor for providing a control signal when the final component of the serial array is pushed from said first cassette; and cassette advancing means responsive to said control signal for replacing said first cassette with an adjacent second cassette when said first cassette is emptied.

2. Apparatus as claimed in claim 1 wherein said cassette advancing means includes means for retracting said base means to permit said first cassette to fall from the bottom of said stack, and means for retaining said second cassette in said guide members while said base means is retracted.

3. Apparatus as claimed in claim 1 wherein said vertically extending guide members comprise a pair of generally C-shaped columns bracketing the ends of said vertical stack of cassettes.

4. Apparatus as claimed in claim 1 wherein said pushing means comprises means for applying pressurized air to the end of said first cassette opposite said component feed path.

5. Apparatus as claimed in claim 1 further comprising means for advancing said components out of said component feed path.

6. Apparatus as claimed in claim 2, said retracting means including a first air cylinder coupled to said base means, said retaining means including a second air cylinder and gripping means engagable with said second cassette, and control means operatively connected to both said first and second air cylinders for operating said second air cylinder prior to operation of said first air cylinder.

* * * * *

UNITED STATES PATENT AND TRADEMARK OFFICE
CERTIFICATE OF CORRECTION

PATENT NO. : 4,653,665

DATED : March 31, 1987

INVENTOR(S) : Douglas L. Heisner; Wayne A. Zahlit; and Leonard J. Lickus

It is certified that error appears in the above-identified patent and that said Letters Patent are hereby corrected as shown below:

On the Title page, item 75 should read as follows:

[75] Inventors: Douglas L. Heisner; Wayne A. Zahlit
both of Downers Grove,
Leonard J. Lickus, Plainfield, all of Ill.

Signed and Sealed this

Seventeenth Day of November, 1987

*Attest:*

DONALD J. QUIGG

*Attesting Officer* *Commissioner of Patents and Trademarks*